Jan. 20, 1942.  W. J. TAYLOR ET AL  2,270,357
CONVEYER SYSTEM
Filed April 29, 1939  13 Sheets-Sheet 1
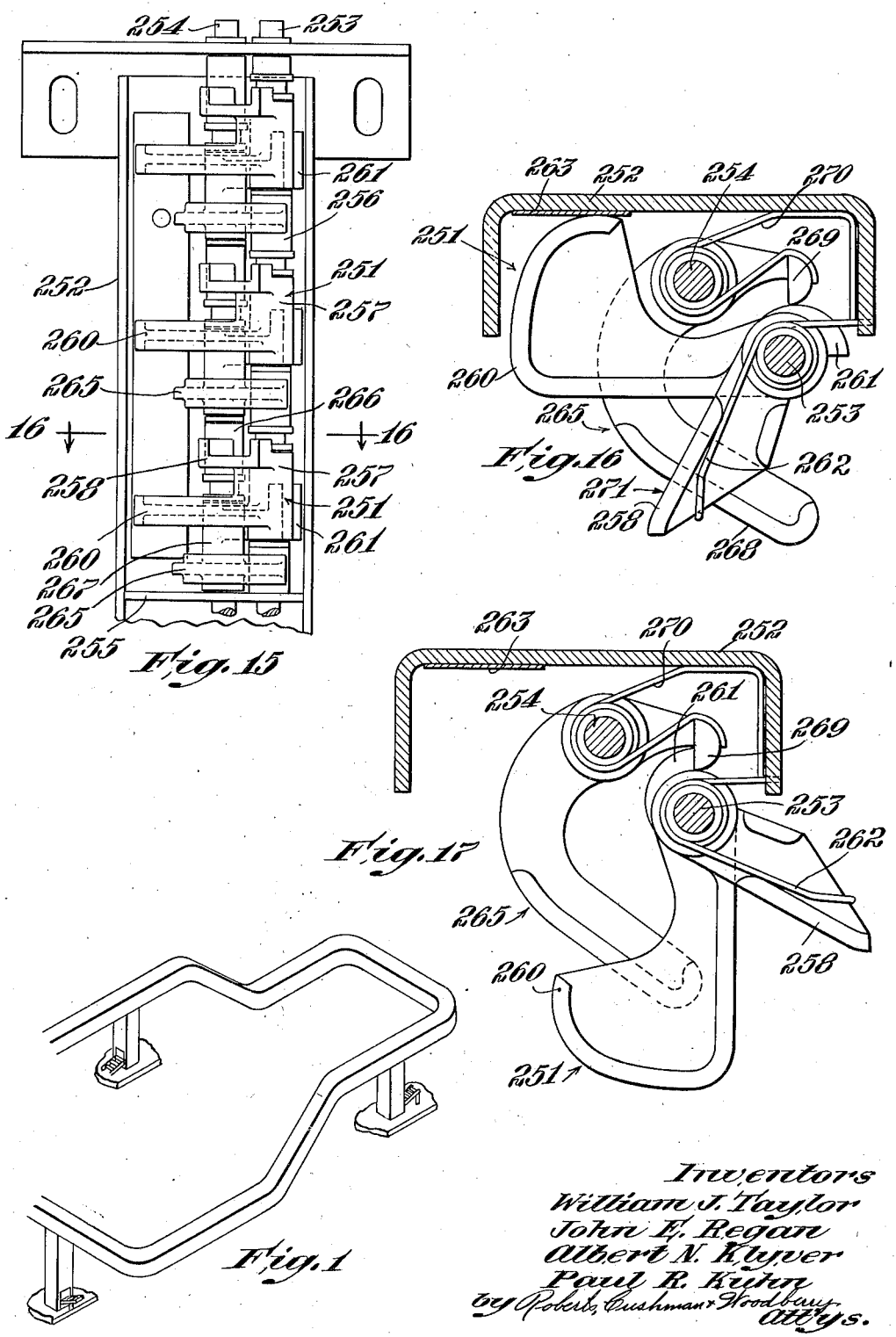

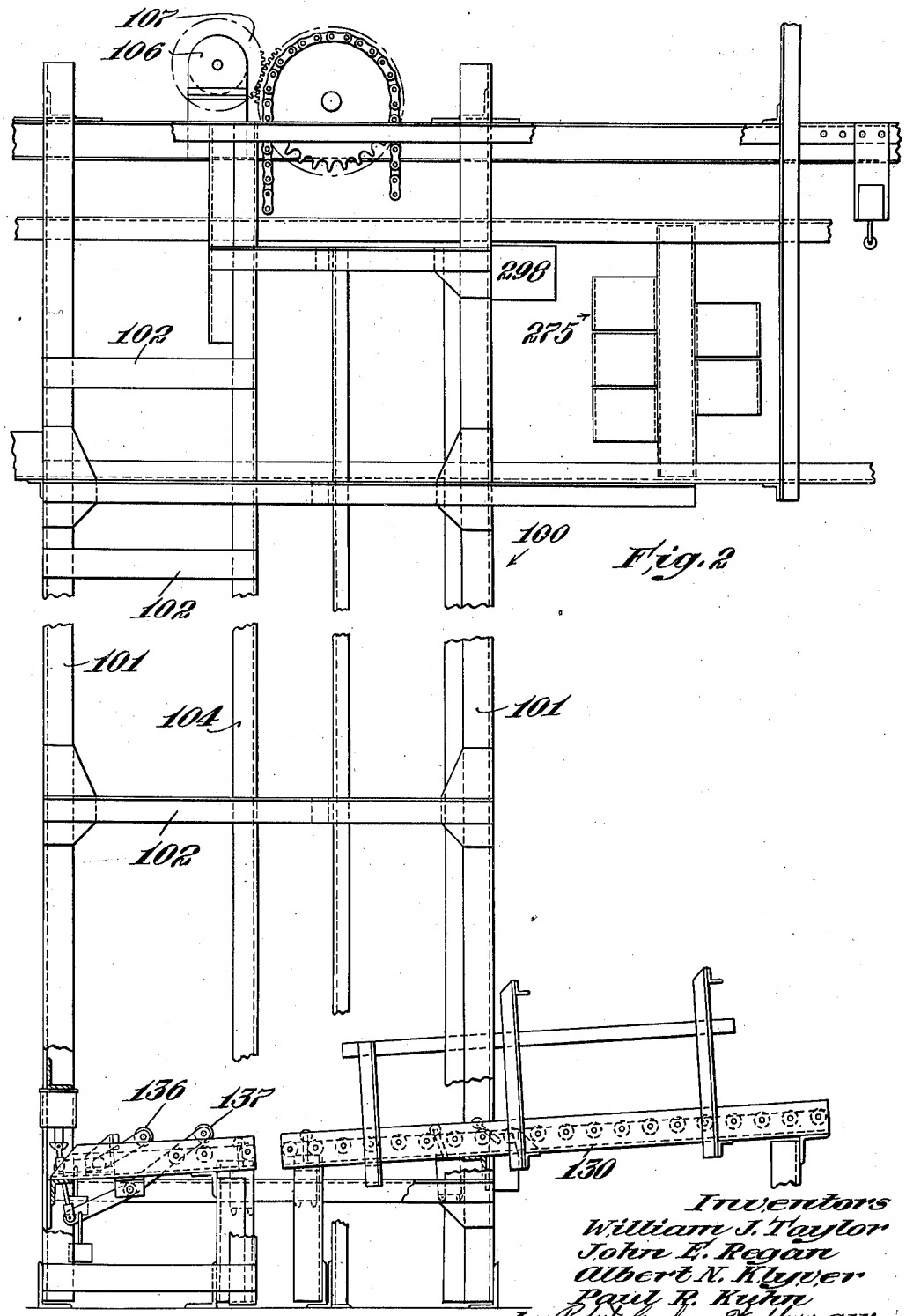

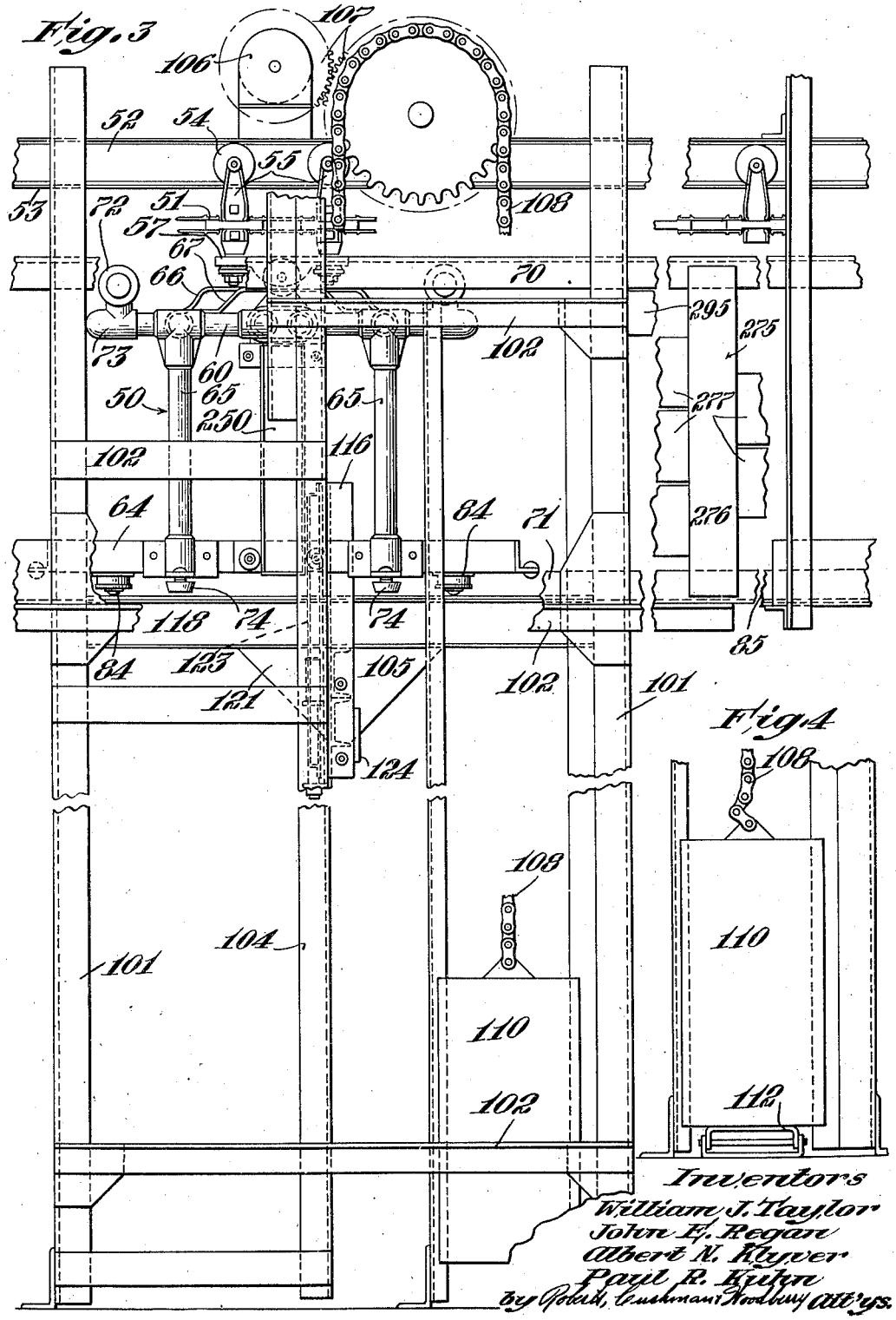

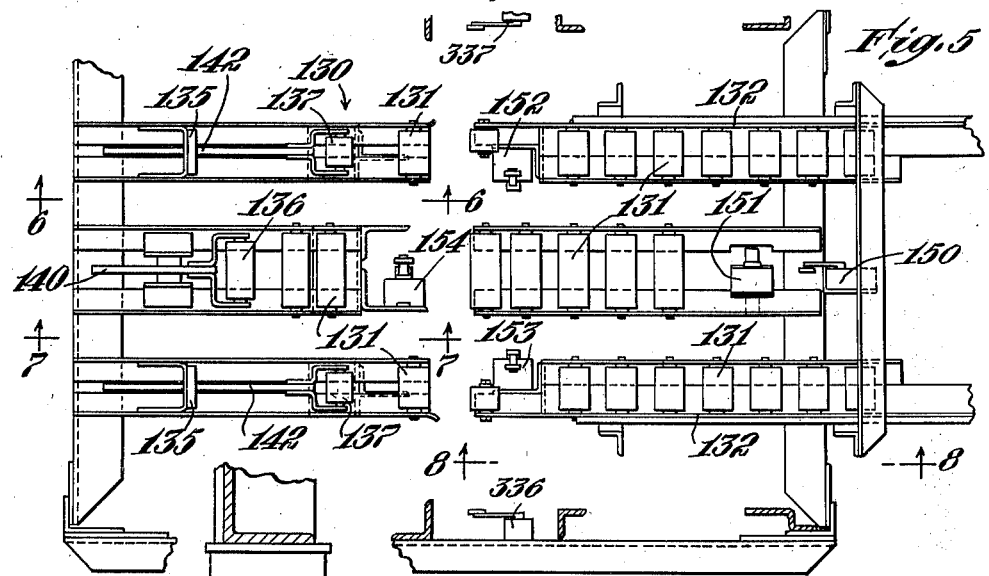
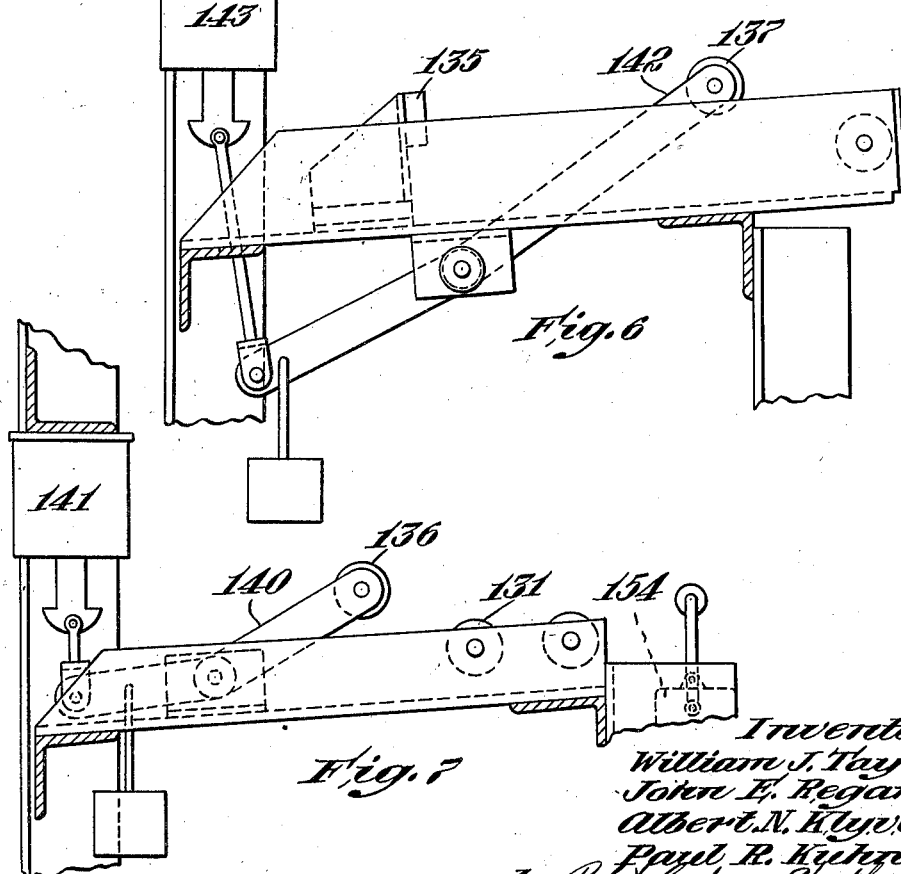

Jan. 20, 1942.   W. J. TAYLOR ET AL   2,270,357
CONVEYER SYSTEM
Filed April 29, 1939   13 Sheets-Sheet 5

Inventors
William J. Taylor
John E. Regan
Albert N. Klyver
Paul R. Kuhn
by Jobabs, Cushman & Woodbury
Attys

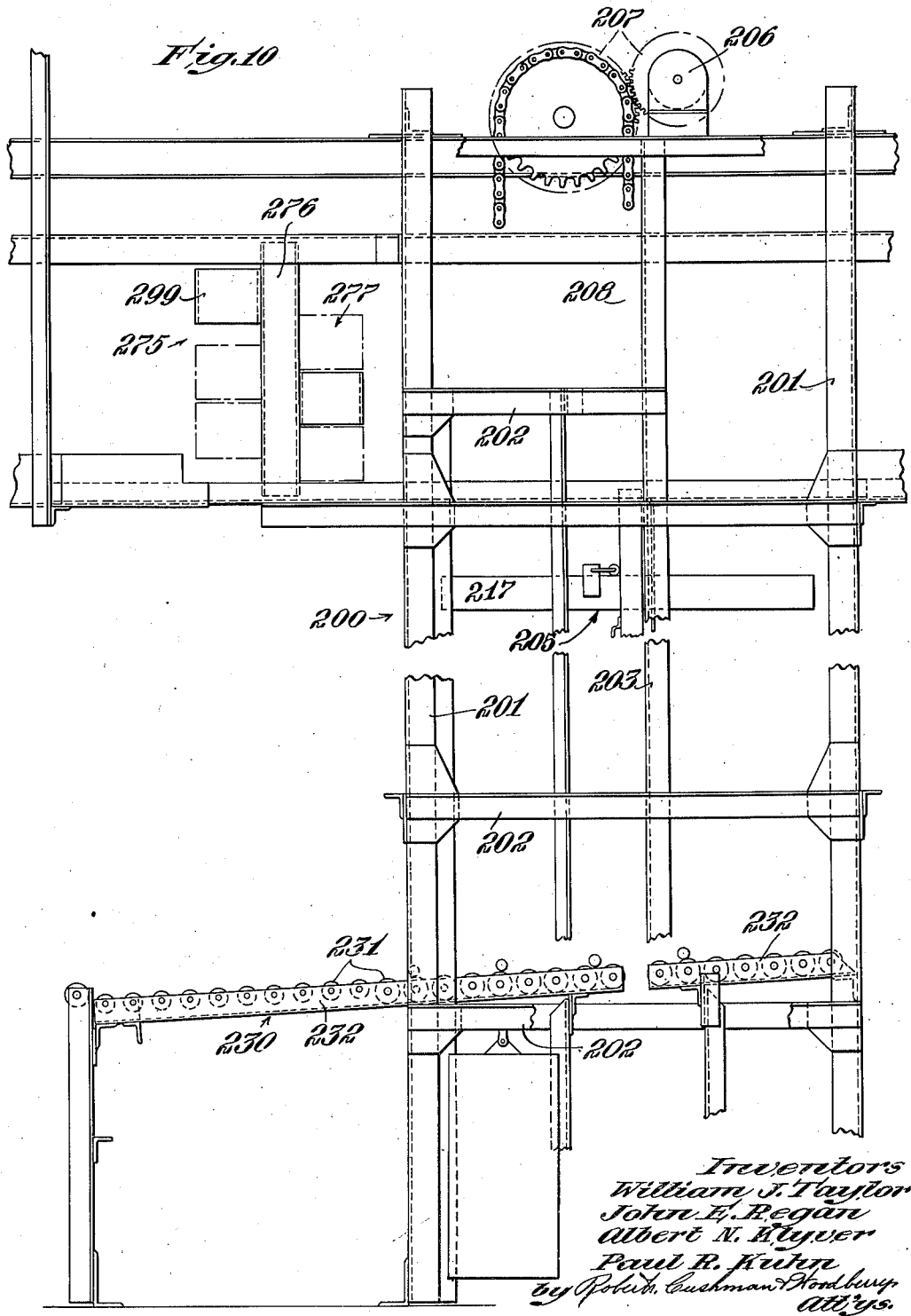

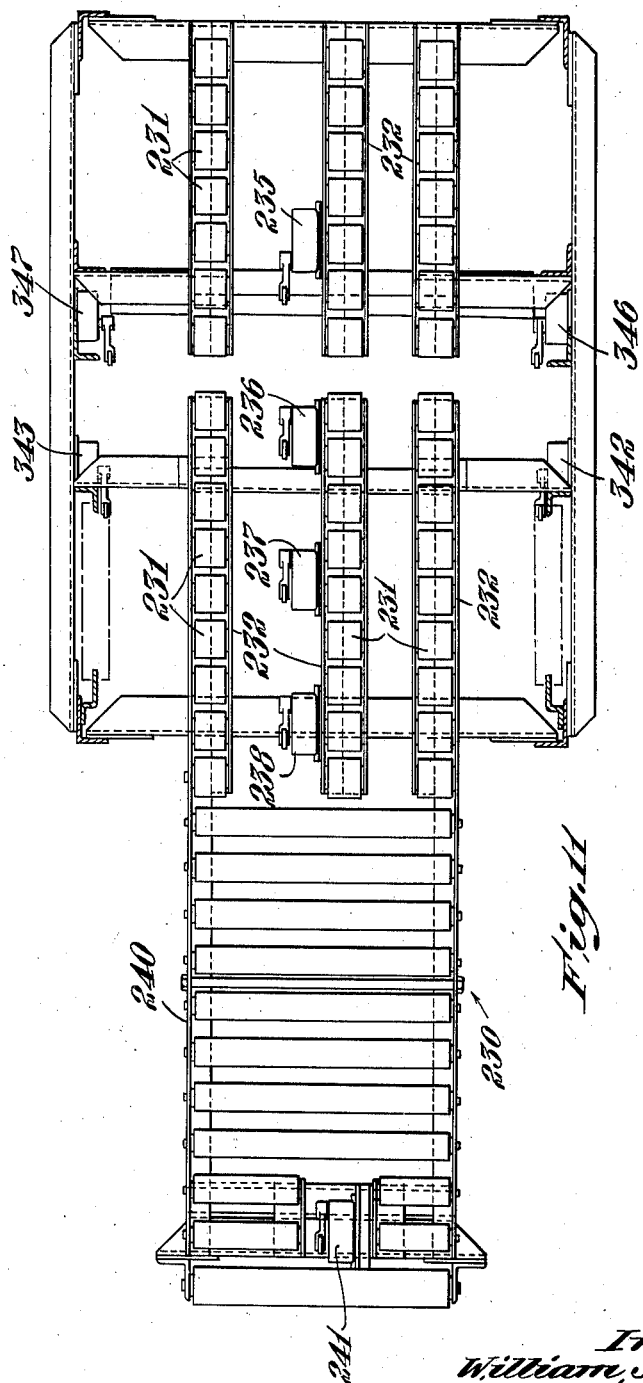

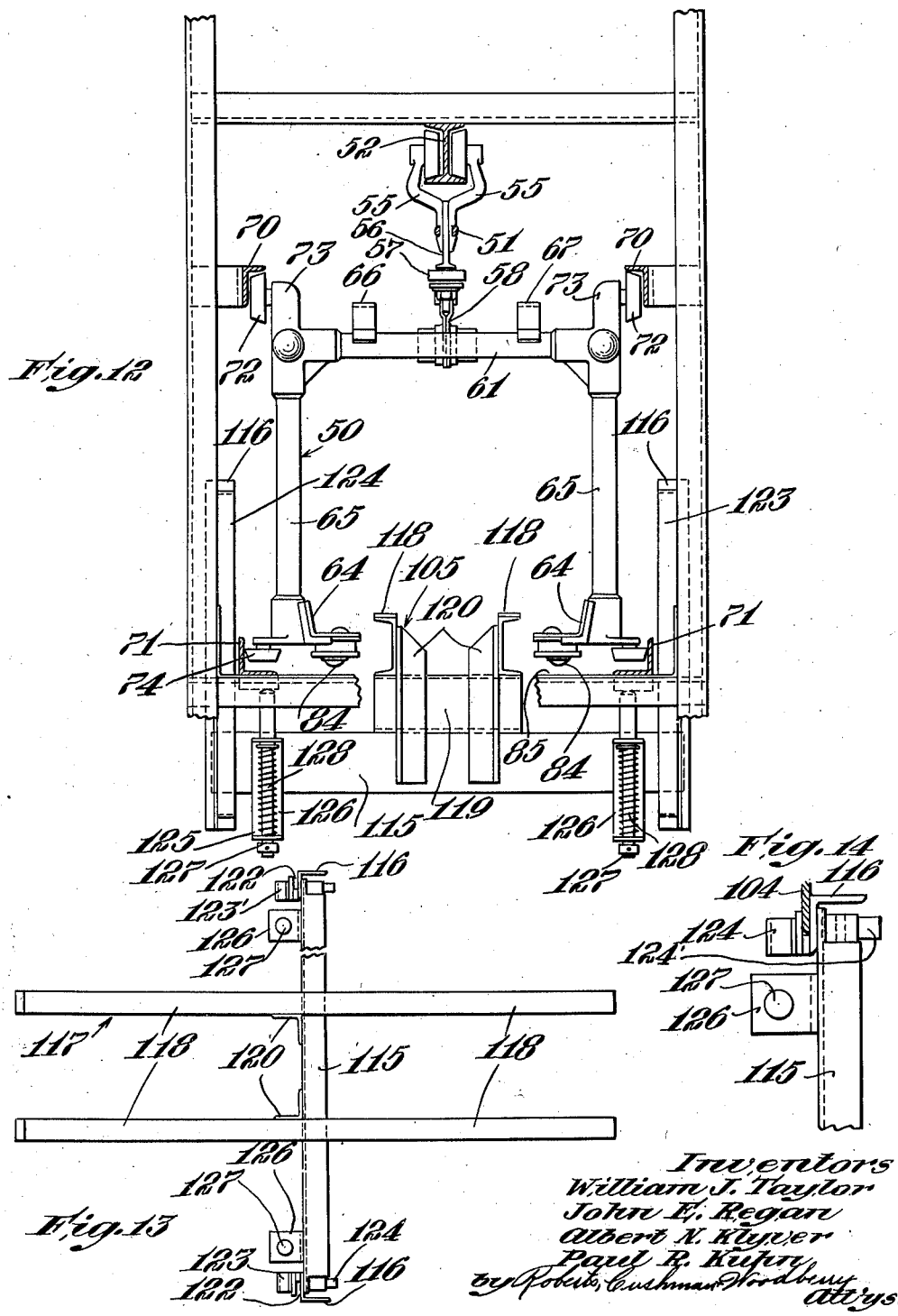

Jan. 20, 1942.          W. J. TAYLOR ET AL          2,270,357
                         CONVEYER SYSTEM
                      Filed April 29, 1939           13 Sheets-Sheet 9

Inventors.
William J. Taylor
John E. Regan
Albert N. Kuyver
Paul R. Kuhn
by Roberts, Cushman & Woodbury
Attys.

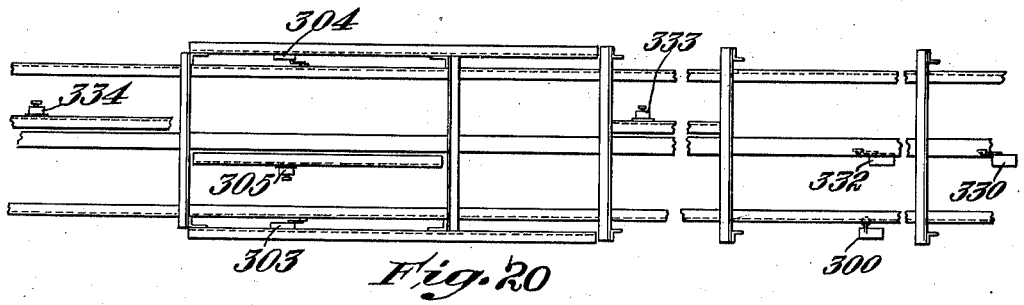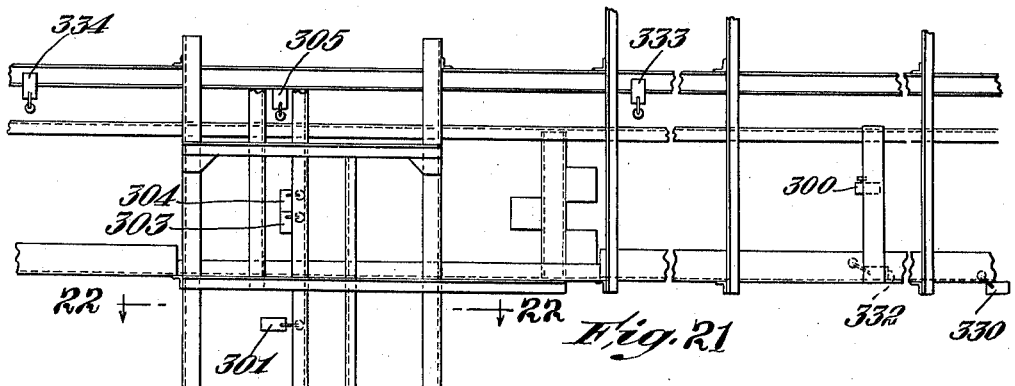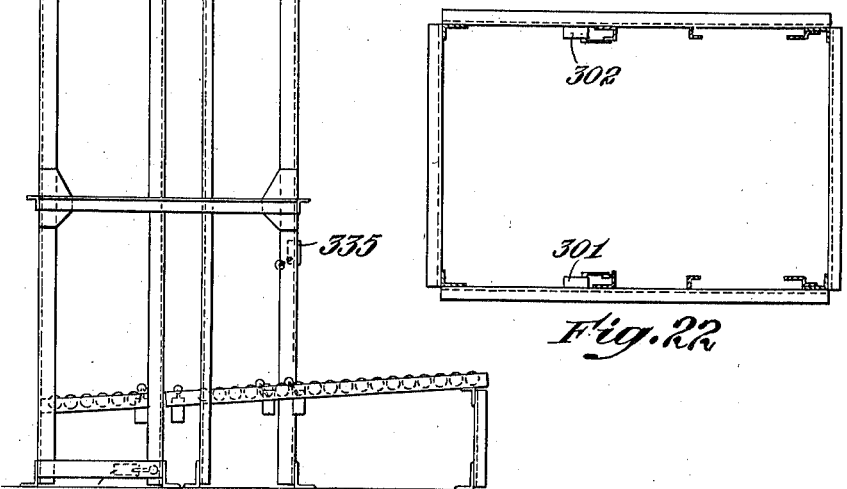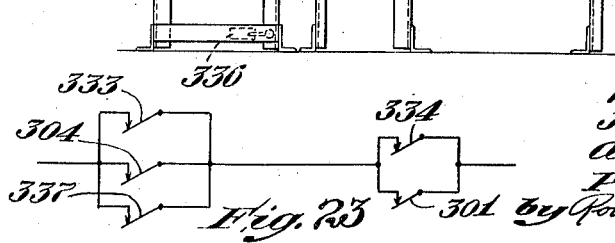

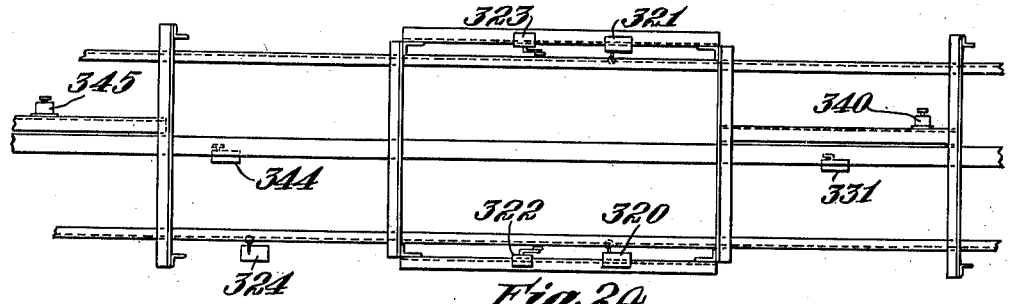
Fig. 24
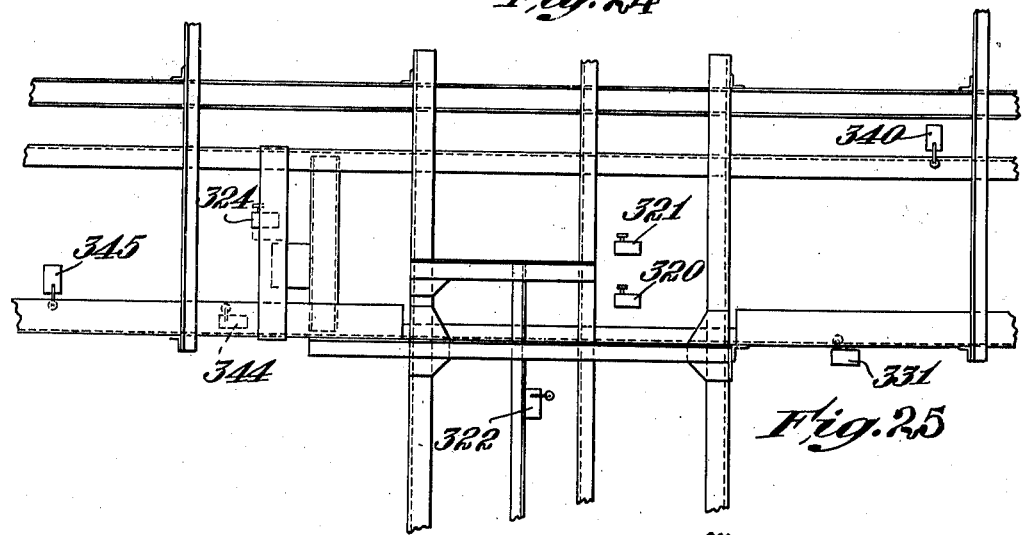
Fig. 25
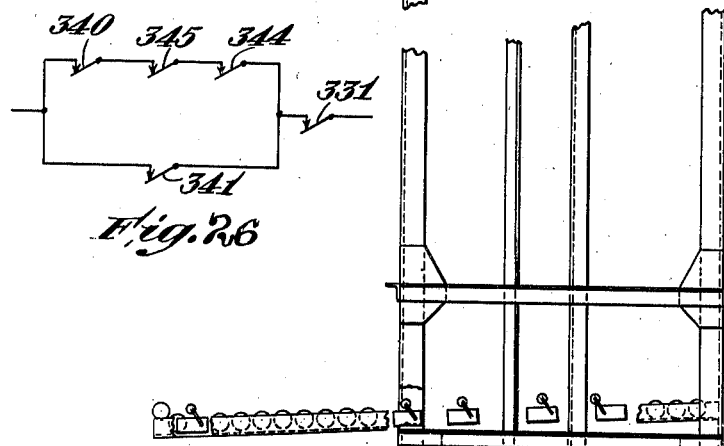
Fig. 26
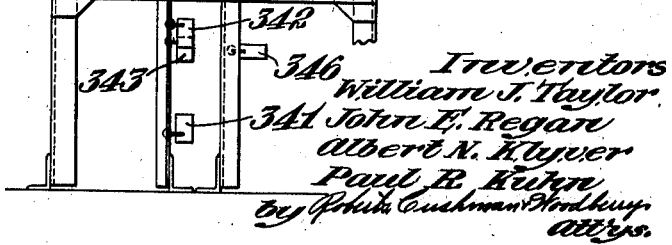

Jan. 20, 1942.  W. J. TAYLOR ET AL  2,270,357
CONVEYER SYSTEM
Filed April 29, 1939   13 Sheets—Sheet 13

Inventors
William J. Taylor
John F. Regan
Albert N. Klyver
Paul R. Kuhrt
by Roberts, Cushman & Woodbury
Att'ys.

Patented Jan. 20, 1942

2,270,357

UNITED STATES PATENT OFFICE 2,270,357

CONVEYER SYSTEM

William J. Taylor, John E. Regan, and Albert N. Klyver, Syracuse, N. Y., and Paul R. Kuhn, Oakland, Calif., assignors, by mesne assignments, to Lamson Corporation, Dewitt, N. Y., a corporation of New York Application April 29, 1939, Serial No. 270,728

14 Claims. (Cl. 214—11)

This invention relates to an improvement in conveyer systems and more particularly in conveyer systems comprising an overhead conveyer along which a plurality of cars travel continuously, and a plurality of stations at which the cars are loaded and unloaded, each station including an elevator adapted to be raised and lowered in a vertical path to transport loads to or from the cars, and a platform by which the loads are fed to or carried from the elevator.

The novel features of this invention upon which protection is sought include the structure and formation of the track and other elements by which the cars are guided in their travel, the structure of the cars including the means by which they are guided and held with the load carrying supports at all times in horizontal planes despite the fact that their path of travel includes both horizontal and inclined sections, as well as curves of various angularity; the structure of the elevators at the various stations; the means for raising and lowering the elevators; the structure of the platforms of the loading and unloading stations; the provision at the platforms of the loading station of means for centering the loads; the means carried by the cars and the elevators which means interact to determine the status of the cars (i. e. loaded or unloaded) and the particular unloading stations to which the loads on the cars are destined, and other features, all of which will appear from a consideration of the following description and of the accompanying drawings which form a part thereof, and in which Fig. 1 is a diagrammatic view in perspective of a conveyer system embodying this invention;

Fig. 2 is a view in side elevation of a typical loading station;

Fig. 3 is a view similar to Fig. 2, a car being shown at the station and the elevator carriage being raised to deliver a load thereto;

Fig. 4 is a side elevation of the elevator counterweight at its lowest position;

Fig. 5 is a plan view of a loading platform at such station;

Figure 8:
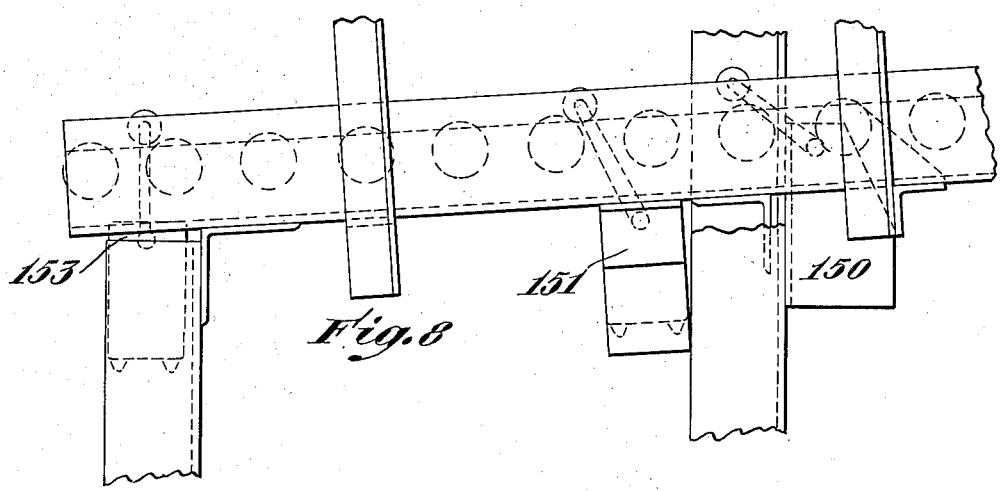
Figure 9:
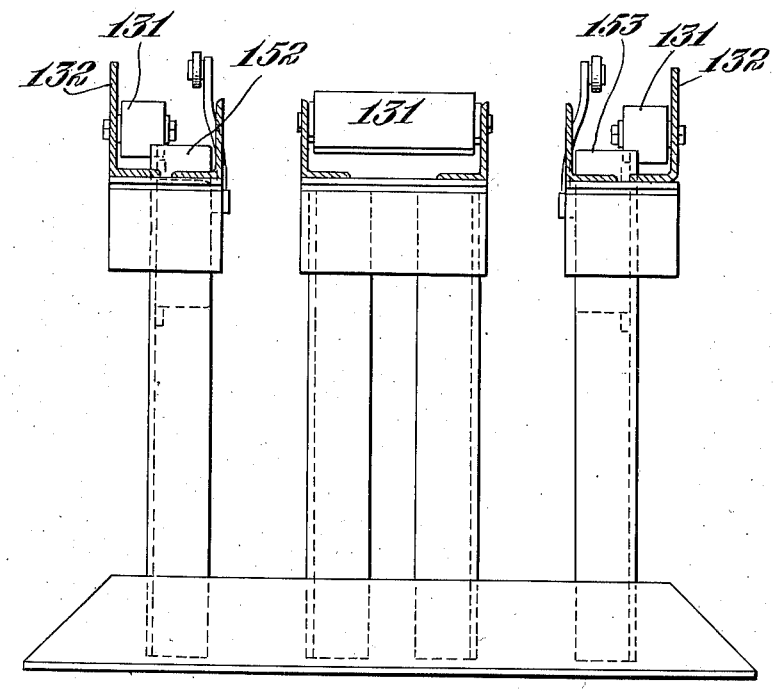
Figure 19:
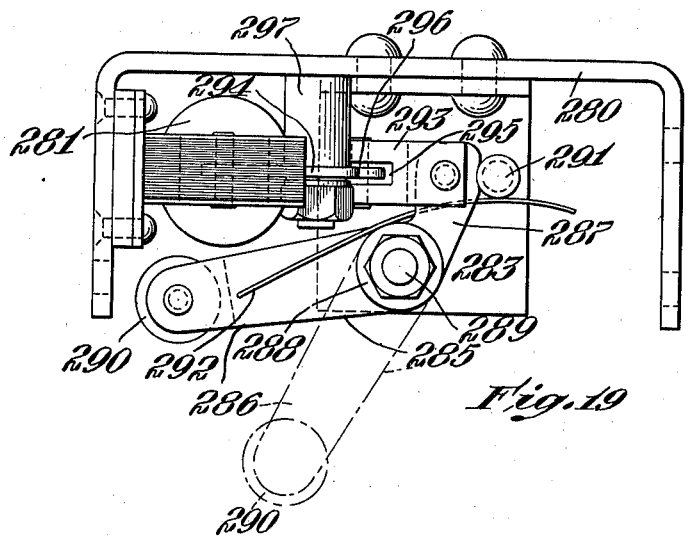
Figure 18:
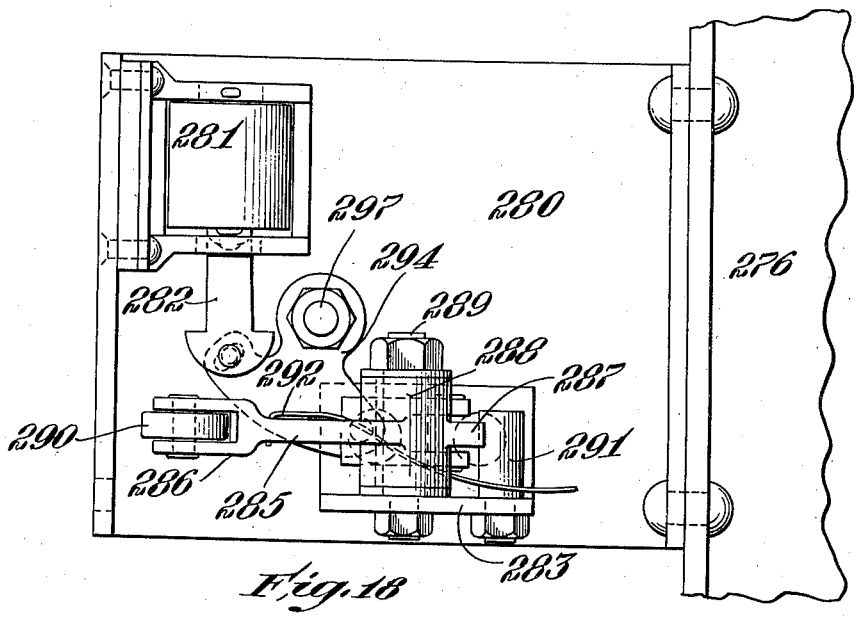
Figure 27:
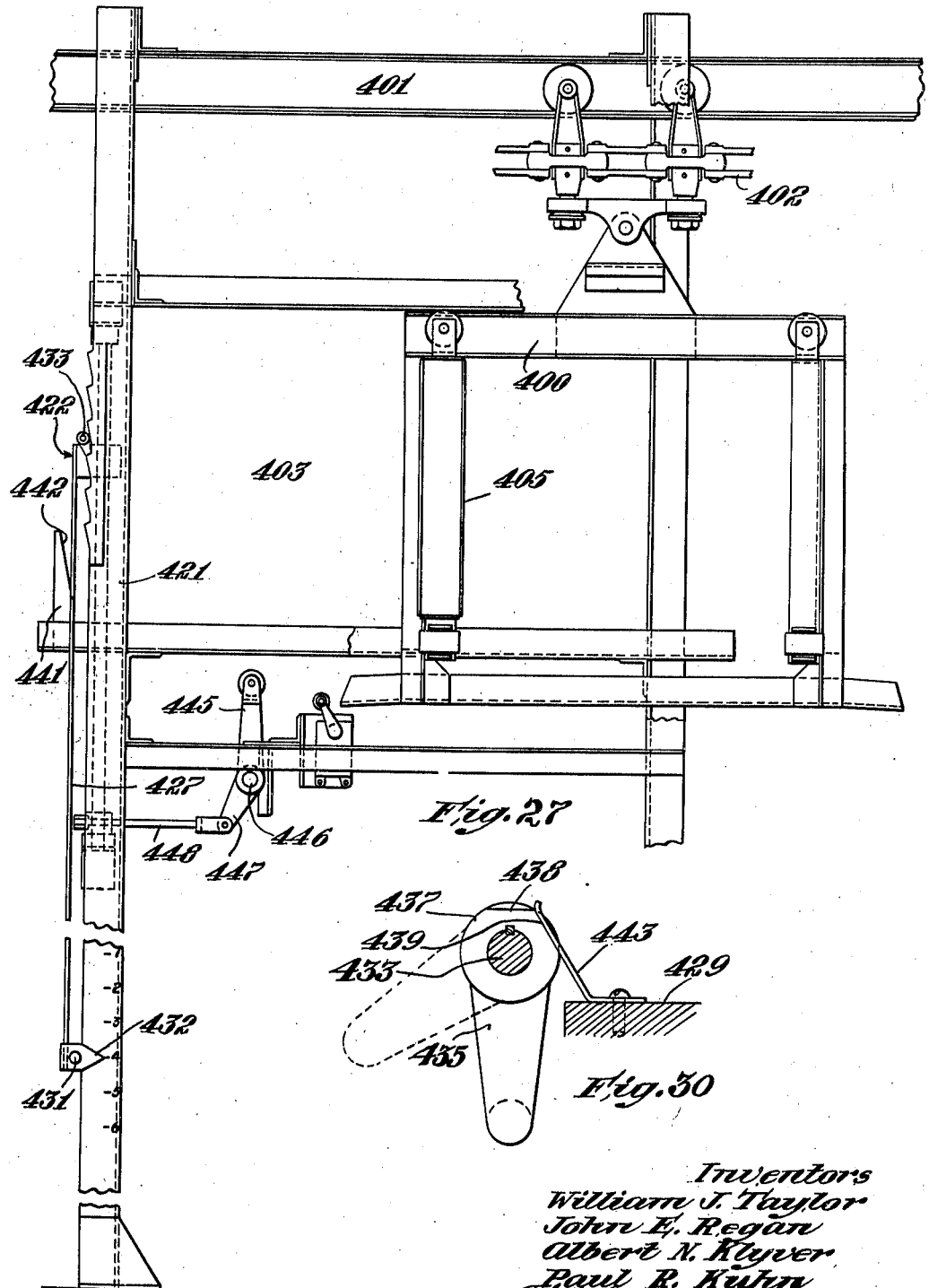
Figure 28:
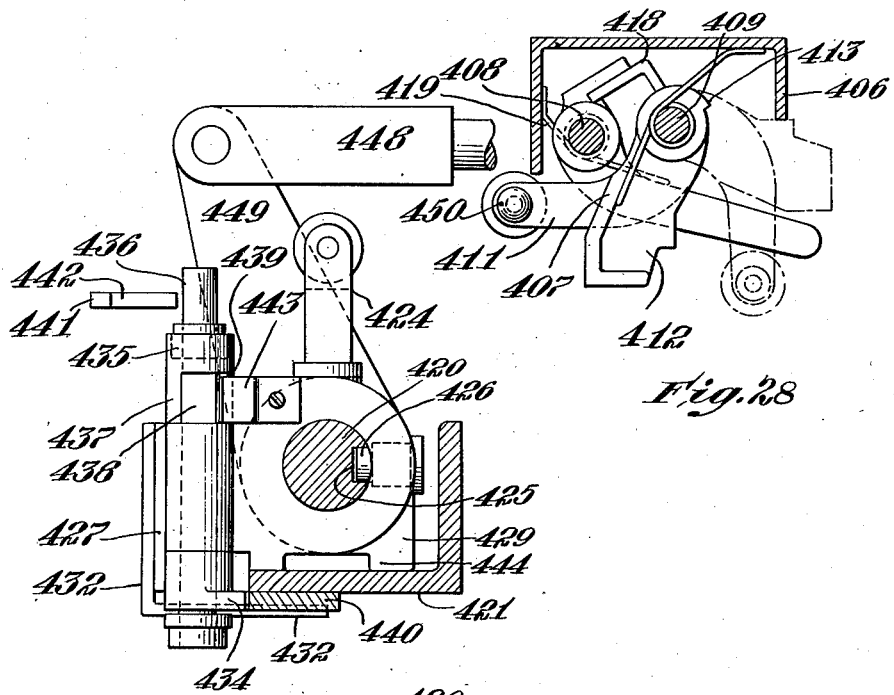
Figure 29:
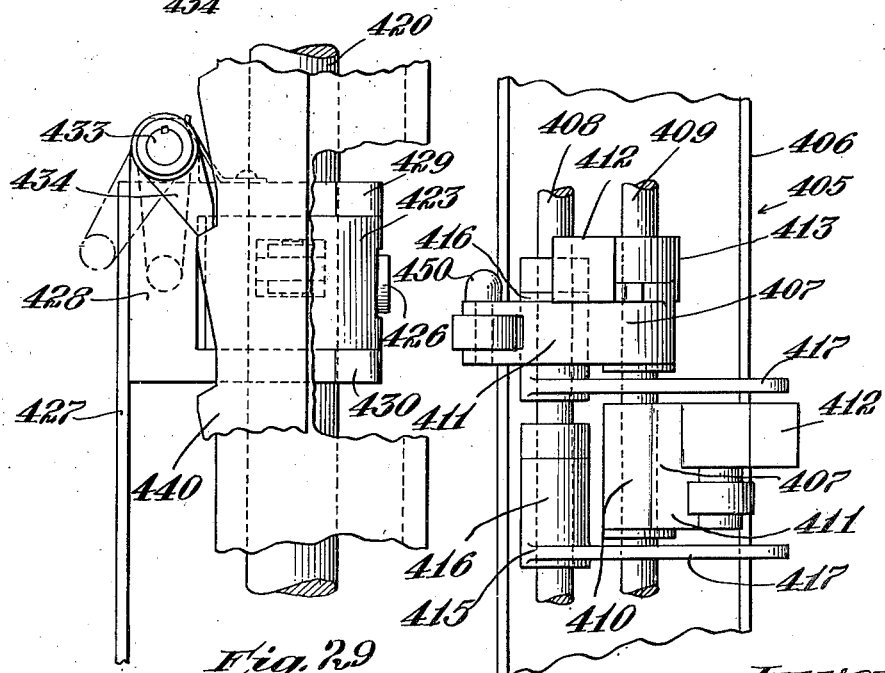

Figs. 6, 7 and 8 are side elevations on larger scale of portions of the platform being taken along the lines 6—6, 7—7 and 8—8 respectively on Fig. 5;

Fig. 9 is an enlarged cross sectional view taken along the line 9—9 on Fig. 5;

Fig. 10 is a view in side elevation of a typical unloading station;

Fig. 11 is a plan view of an unloading platform at such station;

Fig. 12 is a cross sectional view of the conveyer frame showing a car traveling therealong;

Fig. 13 is a plan view of an elevator carriage;

Fig. 14 is a plan view of a portion of such carriage and of the track by which it is guided;

Fig. 15 is a view in elevation of a portion of a dog unit adapted to be mounted upon a car;

Fig. 16 is an enlarged cross sectional view taken along the line 16—16 in Fig. 15 of a dog in the inoperative or released position;

Fig. 17 is a view similar to Fig. 16 with the dog in the operative or set position;

Fig. 18 is a view in elevation of one of the tab mechanisms at a station;

Fig. 19 is a plan view thereof, the tab being shown inoperative in full lines and operative in dotted lines;

Figs. 20 and 21 are plan and side elevation views respectively illustrating the locations of control devices at a typical loading station;

Fig. 22 is a sectional plan view taken along the line 22—22 on Fig. 21;

Fig. 23 is a diagrammatic view illustrating the relationship of certain of such control devices in the circuit;

Figs. 24 and 25 are views similar to Figs. 20 and 21 of control devices at a typical unloading station;

Fig. 26 is a view similar to Fig. 23 of other control devices;

Fig. 27 is a view in side elevation of a station equipped with manually set dog tripping means;

Fig. 28 is a plan view illustrating in assembly the dog unit on the car and the tripping means at a loading station as the car approaches the station;

Fig. 29 is a front elevation of such assembly; and

Fig. 30 is a sectional view taken along the line 30—30 on Fig. 28 of a portion of such dog tripping means.

The conveyer system selected to illustrate this invention in the drawings comprises a plurality of cars 50 by which loads are transported between the various loading stations 100 and unloading stations 200, each provided with an elevator carriage. The elevator carriage 105 of each loading station is supplied with loads by a loading platform and the loads from the elevator carriage of each unloading station are delivered to an unloading platform. Mounted upon each car 50 are a plurality of dogs which indicate the status of the car (i. e. loaded or unloaded), and the destination of the load carried thereby. The stations are each provided with tabs which coact with the dogs on the cars 50 and set them automatically in the proper indicating positions.

The cars 50 are suspended from and advanced by a chain 51 driven continuously by one or more motors or other driving means (not shown). The chain 51 is guided and supported by an I-beam 52 on the lower horizontal flanges 53 of which ride rollers 54 connected by straps 55 to the chain 51. As shown in Figs. 3 and 12, the cars 50 are suspended from the straps 55 through attachments 56, a load bar 57 and a hanger 58.

Each car 50 is made of a plurality of suitably joined tubes 60, 61 and 65 which extend at the top and at opposite sides of the car. The tubes 60 at the upper corners of the car are connected by tubes 61 to the middle pair of which is secured the hanger 58 by which the car is suspended from the chain.

The lower corners of the car are defined by parallel beams 64 joined to the tubes 60 by the side tubes 65. The beams 64 are angular in cross section and the horizontal portions project toward each other to serve as supports for the loads, usually in the form of tote boxes. Mounted on the top of the car are cam straps 66 and 67 which serve purposes which will be set forth hereinbelow.

The cars are supported only at the point of suspension from the chain 51 and as they travel along their path have a tendency to swing. Means on the conveyer frame and cars are accordingly provided to limit and restrain such swinging movements. Mounted upon the conveyer frame are a pair of continuous guide tracks 70 right angular in cross section which enclose the upper side corners of the cars, and a second pair of guide tracks 71 similar in form to the tracks 70 which enclose the lower side corners of the cars.

The tubes 60 at each end carry vertical rollers 72 mounted upon brackets 73 and so positioned that they only engage the tracks 70 when the car is swung longitudinally or laterally out of its normal position shown in Fig. 12. At the joinder of the beams 64 and side tubes 65 are mounted horizontal rollers 74 so positioned that they engage the tracks 71 when the car is swung laterally out of such normal position.

Preferably, as shown in Figs. 3 and 12, a plate 85 secured to the bottom faces of the beams 71 closes the space between them except at the loading and unloading stations. The casters 84 are shown in Fig. 12 in their normal position above the plate 85, but may come into contact therewith and thus serve to steady the car.

Each loading station 100 comprises a frame formed by vertical beams 101 extending from the floor and secured at the upper ends to the conveyer frame and suitably located cross beams 102 and side plates 103. This frame forms a vertical well provided with vertical tracks 104 on which travels intermittently an elevator carriage 105. The elevator carriage is operated by a motor 106 through sprockets 107 and chains 108. One end of each chain 108 is attached to the carriage and the other end is attached to a counterweight 110.

Each counterweight reciprocates in a well defined by two of the vertical beams 101. The upward travel of the counterweight is limited by bumpers 111 and the downward travel is limited by a spring bumper 112. The chain 108 is of such length that the counterweight will strike the bumper 112 just before the elevator carriage reaches its upper station, whereupon the chain will flex as shown in Fig. 4 and the final upward travel of the carriage will be due to the momentum previously imparted to the carriage. Thus any severe shock or jar as the carriage reaches its upper limit is avoided and the carriage will descend by its own weight until the chain 108 again becomes taut and the counterweight 110 acts to prevent further downward movement until the motor is set into operation.

The elevator carriage 105 comprises a transverse beam 115, uprights 116 fixed at the ends of the beam 115, and a platform 117 formed by longitudinally extending beams 118 supported upon a transverse beam 119 resting on the beam 115 and secured to said beams 119 and 115 by angle bars 120 and braces 121. Upon the uprights 116 are mounted strips and angles that define slots 122 in which the tracks 104 are received, cam straps 123 and 123' and cam blocks 124 and 124' which straps and blocks function in a manner to be described hereinbelow. The straps 123 and 123' on one side of the uprights extend approximately the length of the uprights and are much longer than the cam blocks 124 and 124'. (See Fig. 3.) Bumpers 125 which comprise an angle bracket 126, a pin 127 and a spring 128 fixed to the transverse beam 115 yieldably limit the upward travel of the carriage.

At the bottom of the well is mounted an inwardly inclined platform 130 by which loads are delivered to the platform 117 of the elevator carriage. The loading platform 130 comprises six sections arranged in three groups of two sections each and suitably spaced apart to permit the beams 115 and 118 of the carriage to pass freely between the sections. Each section includes freely rotatable rollers 131 over which the load travels, said rollers being mounted in U-shaped strips, the outer leg of the strip on each outer section being extended to form a load guide 132.

The loads supplied to the elevator carriage are usually in the form of tote boxes which vary in size and for convenience have been divided into three classes. In order to insure that the boxes are properly positioned upon the carriage certain means are employed. The boxes are supplied from the right side of the well as shown in Fig. 2. The sections at the left carry stops by which the boxes are centrally positioned longitudinally. Such stops are divided into three classes, stationary stops 135, movable roller stop 136 and movable roller stops 137. The stop 136 includes an arm 140 pivotally mounted intermediate its ends and a solenoid 141, the stop being normally in the raised operative position as shown in Fig. 7 and depressed when the solenoid is energized. Each stop 137 similarly includes a pivotally mounted arm 142 and solenoid 143 and is depressed when the solenoid is energized.

Suitably located in the loading platform are a plurality of circuit makers designated 150, 151, 152, 153 and 154, each provided with an arm tripped by a tote box passing thereover. The circuit makers 151, 152, 153 and 154 are of the dual type, each including normally closed contacts and normally open contacts. The circuit maker 150 is of the single type including normally open contacts. The normally open contacts of circuit maker 150 are in series with the normally open contacts of circuit maker 154 and when these circuit makers are tripped simultaneously by a load the solenoid 141 is energized to depress the stop 136. The normally open contacts of circuit maker 151 are in series with the normally open contacts of circuit makers 152 and 153, and when these three circuit makers are tripped simultaneously by a load the solenoids 143 are energized to depress the stops 137. The normally closed contacts of circuit maker 151 are in series with the contacts of a normally open circuit maker tripped by the conveyer cars 50 to be described later. The normally closed contacts of circuit makers 152 and 153 are in series with each other and also with the normally closed contacts of circuit makers 154, and when tripped simultaneously coact with a car operated circuit maker 300 to be described later to close an energizing relay circuit by which the elevation of the carriage is initiated. It will be understood that since the circuit makers are in series they function only when all the circuit makers of a series are tripped simultaneously.

The loading operation will be considered with reference to the three sizes of tote boxes. The stops 136 and 137 are normally in the position shown to check the movement of the tote boxes. The successive tripping of circuit makers 150 and 151 by the smallest box has no effect upon the positioning features under consideration. This box however advances against the stops 137 and holds the circuit makers 152, 153 and 154 tripped. The medium sized box trips the circuit maker 150 without effect but is large enough so that it simultaneously trips the circuit makers 151, 152 and 153 which cause the depression of the stops 137 and allow the box to advance into contact with the stop 136, and hold the circuit makers 152, 153 and 154 tripped. The largest box is of such size that it trips all the circuit makers simultaneously, whereupon the circuit makers 151, 152 and 153 coact to cause the depression of the stops 137, and the circuit makers 150 and 154 coact to cause the depression of the stop 136 so that the box advances over the depressed stops 136 and 137 into contact with the stationary stops 135 and holds the circuit makers 152, 153 and 154 tripped.

The central positioning of the boxes laterally is controlled by the guides 132 and also by the circuit makers 152 and 153. As pointed out above, these circuit makers are in series at all times, and unless a box is so positioned that it trips these circuit makers simultaneously, the energizing relay circuit can not be closed and the elevation of the carriage will not be initiated.

Each unloading station 200 comprises a framework formed by vertical uprights 201 and cross beams 202 defining a vertical well having guide tracks 203 on which an elevator carriage 205 reciprocates intermittently. The framework is secured at its upper end to the conveyor frame and in the usual assembly rests upon and is supported by the floor. The carriage 205 is actuated by a motor 206 through sprockets 207 and chains 208. The carriage 205 is identical in construction with the carriage 105 and hence will not be described in detail. Elements of the carriage 205 mentioned hereinbelow will be designated by numerals which differ from those used for corresponding elements on the carriage 105 only in that they are in the two hundred class. The carriage 205 normally stands at the waiting level (see Fig. 10) with its platform 217 below the path of travel of the car. When a car 50 with a load destined for a station arrives at that station the carriage 205 is raised from the waiting level to the top level removing on its way the load from the car. After the car has passed on, the carriage 205 with its load descends to the bottom of the well and delivers the load to an unloading platform 230.

The unloading platform 230 (see Fig. 11) like the loading platform comprises six sections arranged in two groups of three sections each and so positioned and arranged as to provide spaces through which the beams 218 forming the carriage platform 217 may pass freely. Each section consists of a U-shaped beam 232 in which are supported a plurality of idler rollers 231 on which the loads rest. Fixed to the central sections of the groups are a plurality of circuit makers 235, 236, 237 and 238, the purpose and function of which is to control the unloading operations as will be set forth in detail hereinbelow. The loads, usually boxes, pass from the platform 230 onto an inclined roller conveyer 240 of any well known construction and provided at its outer end with a circuit maker 241, the purpose and function of which will be set forth later.

Since, as previously stated, the conveyer can travel continuously, the loading and unloading at the various stations take place while the cars are in motion. In order to time the movement of the elevator carriages 105 and 205 their travel is controlled automatically by the conveyer cars as they approach and leave the stations. Moreover, interengaging mechanism at the loading stations and on the cars are provided by which the destinations of the loads on the cars are predetermined. In addition means are provided at each loading station to prevent any attempt to supply a load to an already loaded car and to insure this supply to first empty car arriving after the station is set to supply a load.

The control of the destinations of the loads and the status of the cars, whether loaded or empty, will first be described. The mechanism employed comprises a unit 250 on each car, and units 275 at each loading station, and at each unloading station.

The unit 250 at each car comprises a plurality of dogs 251 carried by a housing 252. The housing 252 is U-shaped in cross section and mounted on one or both sides of the car preferably midway between the ends thereof, as shown in Fig. 3. Fixed longitudinally in the housing 252 (see Figs. 15, 16 and 17) are a pair of parallel rods 253 and 254 mounted in the end walls of the housing and in a partition 255 midway between the end walls and parallel thereto. The dogs 251 are rotatably mounted upon the rod 253 being held in position longitudinally by collars 256. Each dog 251 comprises a sleeve 257 surrounding the rod 253, a finger 258 adjacent one end of the sleeve and a finger 260 adjacent the other end of the sleeve. The fingers project from the sleeve and are at an angle to each other of slightly less than 90° (see Figs. 16 and 17). Projecting from the sleeve 257 at the base of the finger 258 is a pawl 261. The sleeve, fingers and pawl may be integral as shown, or may be separate elements suitably joined together. A spring 262 normally holds the dog as shown in Fig. 16 with the finger 258 projecting from the housing and the finger 260 enclosed therein and resting upon a pad 263.

Rotatably mounted upon the rod 254 are a plurality of latches 265 separated by collars 266, one latch for each dog. The latch comprises a sleeve 267 surrounding the rod 254, a finger 268 and a catch 269. The finger 268 and catch 269 project from the sleeve 267 adjacent opposite ends thereof. While the sleeve, finger and catch are here shown integral, they may of course like the elements of the dog, be separate elements suitably joined together. A spring 270 holds the catch 269 in contact with the pawl 261. From the above description it will be apparent that as the car travels to the left (Figs. 16 and 17) the application of pressure upon the finger 258 in the direction indicated by the arrow 271 rotates the dog through 90° against the urge of the spring 262 to bring the pawl 261 into engagement with the catch 269 so that it will be held in such position with the finger 260 projecting out from the housing, the dog being now referred to as set. Pressure in the same direction applied to the latch finger 268, when the dog is set, will rotate the latch on the rod 254 and cause the catch 269 to release the pawl 261, whereupon the spring 262 returns the dog to its normal inoperative position. Should the latch 265 be tripped when the dog is inoperative the latch will merely turn idly on the rod 254.

The unit 275 at each loading station is mounted upon the conveyer frame adjacent the entrant end of the station and comprises a post 276, U-shaped in cross section, and a plurality of tab mechanisms 277 fixed to the side flanges of the post. The tab mechanisms extend from opposite sides of the post along the path of travel of the conveyer cars. Each mechanism 277 (see Figs. 18 and 19) comprises a housing 280 also U-shaped in cross section mounted with the open side toward such path of travel, one side flange being secured to a side flange of the post. Fixed to the other side flange of the housing is a solenoid 281 having a plunger 282. Supported by the back of the housing 280 upon a bracket 283 is a tab 285 provided intermediate its ends 286 and 287 with a sleeve 288 freely rotatable upon a pin 289 carried by the bracket 283. A roller 290 is mounted upon the end 286. A stud 291 on the bracket 283 engages the end 287 and limits the pivotal movement of the tab 285 in one direction, and a spring 292 normally holds the tab in such position with the roller 290 retracted substantially into the housing as shown in Fig. 19. The end 287 is connected to the plunger 282 by a link 293 and a triangular rocker plate 294. The link 293 is pivoted at one end to the tab and provided at the other end with a slot 295 in which one end of the rocker plate 294 is pivotally secured by a pin 296. The rocker plate 294 is pivoted to a stud 297 fixed to the back of the housing 280 and its other end is pivotally secured to the head of the plunger 282.

The tabs 285 are moved in horizontal planes by the solenoids 281 and the units 275 are so positioned that when a tab is swung out from the housing 280 the roller 290 is in the path of the finger 258 of a dog 251 in the unit 250 of an approaching car. The tab 285 by its contact with the dog finger 258 swings the dog on its rod 253 so that the dog finger 260 is moved out of the housing 252 and held in such position by the engagement of the latch 265 with the pawl 261. In the illustrated embodiment each conveyer car 50 may be provided with two units 250, one on each side of the car and each unit includes six dogs. Similarly the units 275 mounted on opposite sides of the path of the cars contain tabs which engage the dogs with the exception of the one by which the status of the car (i. e. loaded or unloaded) is indicated. Such dog will hereinafter be referred to as a status dog and the dog selected for that purpose in the illustrated embodiment is the top one on the left hand side of the car viewing the car in its direction of travel. Hence the units 275 on that side of the path include only five tabs, while those on the other side include six. Only a five-tab unit is here shown in the drawing at Figs. 2 and 3, but it will be understood that a six-tab unit differs only in the number of tab mechanisms.

The control for the solenoids 281 is not here shown since it forms no part of the invention to which this application is directed. Various forms of control may be employed such for example as that set forth and explained in the copending application of the party Regan filed September 25, 1937 and bearing Serial No. 165,719, patented March 26, 1940, No. 2,194,912.

The dog units 250 and the tab units 275 coact to determine the destination of the loads. The control at a loading station is actuated to cause the tab or tabs of its unit or units to set certain dogs of the car loaded at such station so that, by the means to be described later, such dogs will actuate the unloading mechanism at such predetermined unloading station and no other to remove the load from the car. This control also sets the tab of trip mechanism 298 (Figs. 2 and 3), similar in construction to the units 275 except that its embodies only a single tab, which trips the latch 265 and releases the set dog of the empty car being loaded.

At each unloading station is provided one or two tab units 275 by which the dogs so set for the cars carrying loads destined to such station are released, i. e., restored to their normal inoperative position. The unit or units 275 are mounted upon the conveyer frame at the exit side of the station as shown in Fig. 10. The tab mechanisms 277 are so positioned that when the solenoids are energized, the rollers 290 on the extended tabs 285 trip the fingers 268 associated with the set dogs and thus release the dogs. In addition to the tab mechanisms 277 by which this release of the dog or dogs is performed, the unit 275 at the left hand side of the conveyer path also includes a tab mechanism 299 which acts to trip the fingers 258 of the status dogs on the cars and set such dogs thereby indicating that these cars are empty and ready to receive a load.

The status dog of a loaded car must be released at the station where it is loaded since otherwise attempts to load it will be made at succeeding loading stations. This operation is performed by the trip mechanism 298, previously mentioned, which is mounted on the left hand side of the conveyer frame adjacent the entrant end of the station and is so positioned that, when its tab is extended by the energization of its solenoid, the tab roller 290 trips the finger 268 of the latch 265 associated with the status dog and thus releases the dog. The status dog is thus released before the car is actually loaded.

As stated above, the mechanism at the loading and unloading stations are operated in timed relation to the cars to deliver loads to empty cars and remove loads from the loaded cars. In order to attain this timed relation electric circuits are employed, such circuits including circuit makers and breakers, some in the path of the conveyer to be tripped by the cars, and others in the wells of the loading and unloading stations to be tripped by the carriages therein. Moreover, certain of such circuit makers and breakers serve as safety means to stop the travel of cars or carriages if they are improperly loaded, or if collisions between cars and carriages would otherwise occur. No illustration of the complete electrical circuits is made in the drawings. They may be of any well known type and illustrations thereof are believed to be unnecessary to a full and complete understanding of this feature of the invention.

The operation of the conveyer system embodying this invention will now be briefly described with respect to the loading and unloading of the cars and the inter-relation between the car conveyer and the station mechanism will be set forth with particular reference to Figs. 5, 11 and 20 to 23 inclusive.

As each empty car approaches a loading station the set status dog thereon trips a circuit maker 300 mounted upon the conveyer frame. This circuit maker 300 is in the relay energizing circuit which includes the circuit makers 152, 153 and 154 at the loading platform 130 of the station, and is normally open. Assuming that a load (i. e., a box) is positioned on the platform 130 ready to be delivered to a car, and the circuit makers 152, 153 and 154 are tripped thereby, the tripping of the circuit maker 300 will complete the relay energizing circuit mentioned above, whereupon the motor 106 will raise the load on the platform in the well for the purpose of delivering it to the empty car by which the circuit maker 300 was tripped.

As the carriage 105, having taken on a load at the platform 130, rises the cam strap 123 on the carriage trips first, a circuit maker 301 and second a circuit breaker 303 while the cam strap 123' in unison with the strap 123 first trips a circuit maker 302 and second a circuit breaker 304. The circuit maker 301 is of the dual type comprising normally open contacts and normally closed contacts. The normally open contacts being closed by the tripping of the circuit maker actuate the trip mechanism 298 setting it to release the status dog on the car to be loaded. The normally closed contacts which are opened by the tripping of the circuit maker coact with a circuit breaker 334 as will be described below. The circuit maker 302 actuates the tab mechanism 275 to set the dogs on the car to be loaded to designate the destination of such load. Thus as the car 50 advances certain dogs thereon are set by the tab mechanism 275 to designate the unloading station to which the load on the carriage 105 is destined and the status dog, which was set to indicate that the car is empty, is released by the trip mechanism 298. The circuit breaker 303 opens the circuit of the motor 106 so that the carriage is stopped at its top level with the platform 117 above the plane of the beams 64 of the car.

The circuit breaker 304 is of the dual type having normally closed contacts and normally open contacts. The normally closed contacts being opened by the tripping of the circuit breaker act as a safety and insure stopping of carriage at top level in case circuit breaker 303 should fail. The normally open contacts, which are closed by the tripping of the circuit breaker, coact with circuit breaker 333 as will be described later. It will be noted that the circuit makers 301 and 302 and the circuit breakers 303 and 304 are so positioned and that the cam straps 123 and 123' are of such length that all four control devices remain tripped so long as the carriage 105 is at the upper part of the well.

As the car 50 enters the station the beams 64 thereof come below the load on the platform of the carriage at its up level. When this position is reached a circuit maker 305 is tripped by the cam strap 68 on the car 50 to close the down circuit of the motor 106 so that the descent of the carriage is started and the load on the platform is transferred to the car passing through the station.

The car 50, having a load thereon and with its destination dogs set for a particular unloading station and its status dog released, travels along the conveyer path to the destined unloading station. On its travel the car may pass through several loading and unloading stations undisturbed.

As the loaded car approaches the predetermined unloading station the two destination dogs 250 on the car set to designate the destination of the load will trip circuit makers 320 and 321. The drawing illustrates two circuit makers 320 and 321 on opposite sides of the frame, but the number or location or both of the circuit makers will vary. The tripping of these circuit makers simultaneously causes the motor 206 to raise the car from its waiting level to its top level. The platform 217 which, when the carriage was at the waiting level stood below the path of travel of the car beams 65 as shown in Fig. 10, thereupon engages and raises the load from the car beams 65. As the elevator carriage is raised from the waiting level to the top level the cam blocks 224 and 224' thereon trip circuit breakers 322 and 323 respectively. The circuit breaker 322 is of the dual type having normally closed contacts which, when the breaker is tripped, act to stop the carriage at the top level and normally open contacts which are closed when the breaker is tripped and the function of which is set forth below. The circuit breaker 323 serves as a safety stop to insure the stopping of the carriage at the top level should the circuit breaker 322 fail to function. The cam blocks 224 and 224' are of such length and the circuit breakers 322 and 323 are so positioned that the breakers remain tripped while the carriage is at the top level.

The tab units 275 on the conveyer frame being energized by a circuit maker 341, as will be pointed out below, act as the empty car passes from the station to set the No. 1 or status dog of the car and to release the station indicating dogs on the car. The set status dog then trips a circuit maker 324 which closes a relay energizing circuit by which the motor 206 is actuated to lower the carriage 205. The circuit maker 324 is in series with the normally open contacts of circuit breaker 322 which are closed only when the carriage is raised above the waiting level. Hence the tripping of the circuit maker 324, which is done by each empty car as it passes, will be idle when the carriage is at or below that level.

Since the operations of the conveyer and elevators are, as set forth above, automatically controlled by circuit makers and circuit breakers, a plurality of safety means are provided by which all or certain operations are stopped to prevent collision or damage to the conveyer, elevators or the loads thereon.

As the conveyer cars approach each station they pass a circuit breaker (designated as 330 at the loading station and as 331 at the unloading station). This circuit breaker includes an arm which projects through an opening in the plate 85 midway between the guide tracks 71. A load which has fallen from a car 50 and is being pushed along the plate 85 by a car will trip this arm of the circuit breaker, whereupon the conveyer motor circuit will be broken and the travel of the cars stopped until the load is removed from the plate. Unless this protection were provided the load would fall through the well at the first station reached after the load had fallen from the car.

At the entrant end of each loading station a circuit breaker 332 is mounted on the plate 85 midway between the guides 71. The arm of this circuit breaker is so positioned that it is tripped by the load on each loaded car 50. This circuit breaker is in series with the circuit maker 300 by which, as described above, the raising of the elevator carriage is initiated. The circuit breaker 332 and the circuit maker 300 are located on the same center line so, if, perchance, the status dog of a loaded car were through mistake, set as though the car were empty, the normal functioning of the circuit maker 300 would be prevented by the circuit breaker 332 and no load would be elevated by the carriage 105.

Tripped by the cam strap 67 on each car 50 as it enters each loading station is a circuit breaker 333 which stops the conveyer if the carriage 105 has left the bottom of the well and has not been raised high enough to trip the circuit breaker 304. The circuit breaker 333 and the normally open contacts of the circuit breaker 304 are associated as shown in Fig. 23 so that the tripping of the circuit breaker 333 by each car is idle if the circuit breaker 304 has been previously tripped. Similarly, the same cam strap 67 on each car as it leaves each loading station trips a circuit breaker 334 and stops the conveyer if the carriage 105 is still in the path of travel of the cars and thus prevents a collision between the carriage and the cars 50. The circuit breaker 334 and the normally closed contacts of the circuit maker 301 are in parallel in the conveyor car power circuit (see Fig. 23) and the circuit maker 301 is tripped until the carriage has left the path of travel of the cars. Thus the tripping of the circuit breaker 334 by each car as it passes is idle in normal conditions but is effective when the circuit maker 301 is tripped.

Adjacent the well of the loading station is mounted a circuit breaker 335 which if tripped by a load improperly positioned on the carriage 105 would stop the motor 106.

When the carriage 105, after delivering its load to a car, has descended to the bottom of the well, the cam strap 123 trips a circuit breaker 336 and the cam strap 123' trips a circuit breaker 337. The circuit breaker 336 opens the circuit of the motor 106 and stops the descent of the elevator carriage 105. The circuit breaker 337 is of the dual type having normally closed contacts and normally open contacts. The normally closed contacts being opened by the tripping of the circuit breaker act as a safety to insure the stopping of the carriage at the bottom of the well if the circuit breaker 336 should not function properly. The normally open contacts when closed by the tripping of the circuit breaker render the tripping of the circuit breaker 333 by each car approaching the station idle if the carriage be at the bottom of the well.

Fig. 23 illustrates one arrangement of the circuit devices 301, 304 and 337 by which the tripping of the circuit breakers 333 and 334 by each car is made futile if the carriage is at the upper part of the well ready to deliver a load or at the bottom of the well in its normal position of rest when a car approaching a station trips the circuit breaker 333 or if the carriage having delivered its load has descended far enough in the well to release the circuit breaker 301 when a car leaving the station trips the circuit breaker 334.

As each car 50 approaches the unloading stations the cam strap 67 thereon trips a circuit breaker 340 which opens the motor circuit and stops the conveyor if the carriage 205 is above the waiting level to such an extent that a collision would take place. This circuit breaker is in parallel with the normally closed contacts of a circuit maker 341 (see Fig. 26) which is so positioned as to be tripped by one of the counterweights 210 when the carriage has been raised above the waiting level. The circuit maker 341 is of the dual type having also normally open contacts which are closed when the circuit maker is tripped, and which thereupon energize the solenoids 281 of the tab units 275 so that the destination dogs of the car having delivered are returned to their normal position.

As the carriage 205, after delivering its load to the platform 230, returns to the waiting level the counterweights 210 trip in succession a circuit breaker 342 and a circuit maker 343. The tripping of the circuit breaker 342 opens the motor circuit to stop the ascent of the carriage. The circuit maker 343 must always be below the circuit breaker 342 so that it will be tripped by a counterweight as the carriage coasts to rest after the motor 206 has stopped. This circuit maker 343 is in series with the circuit makers 320 and 321 by which, as pointed out above, the raising of the carriage from the waiting level to the top level is controlled so that if, for any reason, the carriage is not at the waiting level the tripping of these circuit makers has no effect.

Should it happen that the load is not removed from the car by the carriage 205 which has thus been raised from its normal waiting position the load remaining on the car trips a circuit breaker 344 which opens the motor circuit and stops the conveyer. The circuit breaker 344 is mounted on the plate 85 midway between the guides 71 with its arm in the path of travel of the load. This circuit breaker 344 is of course tripped by the load of each loaded car that passes but, being in parallel with the normally closed contacts of circuit maker 341 fails to function except when the carriage has been raised from the waiting position to such a distance that the circuit maker 341 has been tripped by the counterweight. The cam strap 67 of each car leaving an unloading station trips a circuit breaker 345. This circuit breaker, being in series with the circuit breakers 340 and 344 and in parallel with the circuit maker 341, causes the conveyer to stop only if the carriage 205 has not descended from the top level to such an extent that the circuit maker 341 has been released by the counterweight. The relation of these circuit breakers and circuit maker is shown in Fig. 26.

After the load has been removed by the carriage 205, the latter having started its descent upon the tripping of the circuit maker 324, continues its descent until the cam straps 223 and 223' on the carriage 205 trip circuit breakers 346 and 347 respectively, whereupon the travel of the carriage stops. The load on the carriage platform 217 has meanwhile been removed by the unloading platform 230, as the carriage descends through the spaces between the sections, and rests upon and trips certain or all of the circuit breakers 235, 236, 237 and 238. The inclination and construction of the unloading platform is such that the load placed thereon is moved by gravity out of the well toward the circuit maker 241 at the outer end thereof. The circuit breakers 235, 236, 237 and 238 are in series with the circuit maker 241 so that after the load has left the well and released the last circuit breaker 238, the circuit maker 241, being tripped by the load, will close the circuit and cause the motor to raise the carriage 205 to its normal position at the waiting level at which its upward travel is stopped by the tripping of the circuit breaker 342 and at which it remains until a car carrying a load destined to its station arrives thereat.

Figs. 27, 28, 29 and 30 illustrate another type of dog tripping means at a loading station. Such means are actuated manually rather than through electrical means as are actuated the tab units previously described. Shown in Fig. 27 is a car 400 supported from a track 401 and advanced by a chain 402 as it enters a station 403. Mounted upon the side of the car 400 near the forward end thereof is a control unit 405 which comprises a housing 406 in which are mounted a plurality of dogs 407 similar in structure, function and operation to the dogs 251. Mounted in the end walls of the housing 406 are a pair of parallel rods 408 and 409. The dogs 407 are carried by the rod 409 and are rotatable relative thereto. Each dog 407 comprises a sleeve 410 surrounding the rod 409, and fingers 411 and 412 adjacent the ends of the sleeve and preferably as here shown integral therewith. At the base of the finger 412 is formed a pawl 413. The dog is normally held by a spring 414 in the position shown in full lines in Fig. 28 and in the upper position shown in Fig. 29 with the finger 411 extending forwardly of the housing and the finger 412 projecting outwardly from the housing at right angles thereto.

Associated with each dog 407 is a latch 415 rotatably supported by the rod 408. The latch 415 comprises a sleeve 416 which surrounds the rod 408, a finger 417 projecting from one end of the sleeve 416, a catch 418 projecting from the other end of the sleeve in position to engage the pawl 413 as shown in Fig. 28, and a spring 419 by which the catch 418 is held in contact with the pawl 413.

The dog tripping unit comprises a post 420 mounted upon an upright 421 of the loading station. Supported upon the post 420 is a tab 422 comprising a sleeve 423 which surrounds the post and a finger 424. The tab 422 may be raised or lowered on the post but is held against rotation relative thereto as by the keyway 425 and stud 426 shown in Fig. 28. The tab 422 is reciprocated on the post 420 by a strap or bar 427 having fixed to its upper end a U-shaped block 428, the finger plates 429 and 430 of which extend above and below the sleeve 423 as shown in Fig. 30. At the lower end of the bar 427 is secured a handle 431 and an index pointer 432. The pointer 432, as will be pointed out below, registers with a row of numerals on the upright 421. Carried by the block 428 in suitable bearings is a stud shaft 433 having at one end a pawl 434 and at the other end an arm 435 carrying an outwardly projecting stud 436 and a sleeve 437 having flattened surfaces 438 and 439, the arm and sleeve being here shown as integral. The pawl, arm and sleeve are keyed to the shaft 433 so that they move in unison therewith. Fixed to the upright 421 is a ratchet plate 440 positioned as shown in Fig. 27 so that the pawl 434 engages the teeth thereof. Mounted adjacent the upright 421 is a plate 441 having an inclined surface 442 with which the stud 436 engages as the block 428 is lowered. Fixed to the upper finger plate 429 is a plate 443 of spring metal which engages one or the other of the surfaces 438 and 439 on the sleeve 437. The finger plates 429 and 430 are provided with feet 444 which engage the upright 421 and prevent the plates from turning with the post 420.

The dogs on an empty car are in the position shown in full lines with the fingers 412 projecting from the car. The setting of the tripping unit is performed manually in the following manner. The tab 422 is normally lowered to the inoperative position shown by dotted lines in Fig. 27, the pawl 434 being yieldably held against the edge of the plate 440 below the teeth. The operator grasps the handle 431 and raises the tab to the desired height, being guided by the pointer 432. The pawl 434 holds the tab at that level in the path of travel of the finger 412 on the approaching car and as the car passes the finger 412 so engaged is swung into the dotted line position shown in Fig. 28 and the finger 411 extended. When the car reaches the unloading station for which it has been destined the finger 411 of the dog trips the control mechanism thereat as described above and the unloading operations take place.

The arm 435 is in the path of travel of a boss 450 upon the outer end of the finger 411 thus set and is swung thereby into the position shown by dotted lines in Fig. 30 rotating the shaft 433 clockwise. The pawl 434 is thus disengaged from the plate 440 and the tab 422 returns by gravity to its normal position. The arm 435 is tripped by the plate 441 as that position is reached so that the shaft is rotated counterclockwise and the pawl returned into engagement with the edge of the plate 440.

Should the operator set the tripping unit when a load is approaching or should the dogs on a loaded car be set in the empty position confusion would arise and in order to avoid this difficulty the following means are provided (see Fig. 27). Pivotally supported upon the frame of the loading station is an arm 445 which projects into the path of travel of the cars and is tripped by the loads thereon and swung counterclockwise. Fixed to the rockshaft 46 which carries the arm 445 is an arm 447 connected by a link 448 to an arm 449 fixed to the post 420. Hence, when the arm 445 is tripped the post 420 is rotated and the tab finger 424 is swung into engagement with the arm 435 whereupon the shaft 433 is rotated as described above and the unit restored to its normal inoperative position.

From the above description it will be apparent that this invention relates to a conveyer system comprising a plurality of continuously traveling load-transporting cars, loading and unloading stations by which loads are supplied to and removed from the cars while in motion, each station including a traveling carriage, interacting means along the paths of the cars and the carriages whereby the latter are caused to function automatically with respect to the cars, means on the cars which coact with means at the stations to predetermine the destination of the loads and to designate the status (i. e., loaded or empty) of the cars, means by which the cars are guided around curves and from one level to another in their travel, automatically operated means by which the proper interrelation of cars and carriage is insured and by which collisions and other objectionable occurrences are avoided, means for handling the loads which are to be supplied to the cars and which are removed therefrom and various mechanical and structural features, all of which have been set forth in detail.

While certain embodiments of this invention have been described, it will be understood that the invention is not limited thereto and that other embodiments may be made without departing from the spirit and scope of the invention as set forth in the following claims.

We claim:

1. In a conveyer system comprising an overhead conveyer including a plurality of continuously traveling load-transporting cars and a plurality of loading and unloading stations, each station including an intermittently traveling carriage by which loads are transported to or from the cars, control devices at each loading station tripped by said cars, means set into operation by such devices when tripped to cause the carriage at a loading station to transfer a load to the car by which such devices are tripped, dogs on said cars constructed and arranged to be set to indicate the unloading station to which loads thereon are destined, control devices tripped by the carriage by which the load is transferred, and means actuated by said last-named control devices for setting the dogs on the car to which the load is transferred to indicate the destination of such load.

2. In a conveyer system comprising an overhead conveyer including a plurality of continuously traveling load-transporting cars and a plurality of loading and unloading stations, each station including an intermittently traveling carriage by which loads are transported to or from the cars, control devices at each loading station tripped by said cars, means set into operation by such devices when tripped to cause the carriage at a loading station to transfer a load to the car by which such devices are tripped, dogs on said cars constructed and arranged to be set to indicate the unloading station to which loads thereon are destined, control devices tripped by the carriage by which the load is transferred, means actuated by said last-named control devices for setting the dogs on the car to which the load is transferred to indicate the destination of such load, control devices at said unloading stations tripped by the dogs on the cars transporting loads destined to such stations, and means actuated by said control devices when tripped for causing the carriages at such unloading stations to remove such loads.

3. In a conveyer system comprising an overhead conveyer including a plurality of continuously traveling load-transporting cars and a loading station, such station including an intermittently traveling carriage by which loads of various sizes are transported to the cars and a platform by which such loads are supplied to the carriage, said platform leading inwardly toward the path of travel of the carriage, means for advancing loads over said platform toward such path of travel, a plurality of control devices tripped by said load according to its size for centering the load upon the platform, a control device tripped by each empty car as it approaches the loading station, and means actuated by the simultaneous tripping of said last-named device and certain of the devices tripped by the load to cause the carriage to remove such load from the platform and transport it to the car by which the device was tripped.

4. In a conveyer system comprising an overhead conveyer including a plurality of continuously traveling load-transporting cars and a loading station, such station including an elevator carriage intermittently traveling in a vertical well, and a loading platform at the bottom of the well, such platform comprising spaced sections so that the load-carrying platform of the carriage may pass between such sections and the carriage normally rests at the bottom of the well with its platform below the plane of the loading platform, a plurality of control devices carried by the loading platform and tripped by loads of various sizes properly centered thereon according to size over the spaces between the platform sections, a control device tripped by each empty car as it approaches said loading station, and means actuated by the simultaneous tripping of said last-named control device and of certain of the devices tripped by the load to raise the elevator carriage thus removing the load from the loading platform and transporting it to the car by which the device was tripped.

5. In a conveyer system comprising an overhead conveyer including a plurality of continuously traveling load-transporting cars and a plurality of loading and unloading stations, each loading station including a carriage by which loads are transferred to said cars, and means for actuating said carriages, such means being controlled by said cars, each car being provided with a movable status dog which in one position indicates that the car is loaded and in another position indicates that the car is empty, a control device tripped by the status dog of a car when in the position indicating that the car is empty, such tripping occurring as the car approaches each loading station, connections between said devices and the carriage-actuating means which cause the latter to operate when the devices are tripped, and a second control device tripped by the load of each loaded car as it approaches each loading station, both said devices at each station being set so that they will be tripped simultaneously by a loaded car, the status dog of which is set to indicate that the car is empty, and said last-named device being an element of the connections recited above and acting when tripped to prevent the operation of the carriage-actuating means.

6. In a conveyer system comprising an overhead conveyer including a plurality of continuously traveling load-transporting cars and a plurality of loading and unloading stations, each station including a carriage by which loads are transferred to or removed from said cars, said carriages being movable into and out of the path of travel of said cars, and means for actuating said carriages, a control device at each station positioned to be tripped by each car as it leaves the station, and connections between each control device and the car-advancing means whereby the travel of the cars is stopped if the device is tripped when the carriage at its station is in the path of travel of the cars.

7. In a conveyer system comprising an overhead conveyer including a plurality of continuously traveling load-transporting cars and a plurality of loading and unloading stations, each station including a carriage by which loads are transferred to or removed from said cars, said carriages being movable into and out of the path of travel of said cars, and means for actuating said carriages, a control device at each station positioned to be tripped by each car as it leaves the station, a second control device at each station positioned to be tripped by the carriage when in the path of travel of the cars, and connections between said devices and the car-advancing means whereby if the first-named device at a station be tripped by a car when the second-named device is tripped by the carriage of that station, the travel of the cars is stopped.

8. In a conveyer system comprising an overhead conveyer including a plurality of continuously traveling load-transporting cars and a plurality of loading and unloading stations, each unloading station including an elevator carriage intermittently traveling in a vertical well, by which loads are removed from said cars, means for operating said carriage, and a counterweight connected to said carriage and guided for travel in said well, a control device tripped by said counterweight to check the upward travel of said carriage at a waiting level below the path of travel of said cars, a control device tripped by a car having a load destined for such station, the tripping of said device causing the operating means to raise the carriage and remove the load from the car, a control device tripped by said counterweight to stop the travel of the carriage after it has removed the load, and another control tripped by said car as it leaves the station for causing said operating means to lower the carriage with the load therein to the bottom of the well.

9. In a conveyer system comprising an overhead conveyer including a plurality of continuously traveling load-transporting cars and a plurality of loading and unloading stations, each unloading station including an elevator carriage intermittently traveling in a vertical well, by which loads are removed from said cars, means for operating said carriage, and a counterweight connected to said carriage and guided for travel in said well, a control device tripped by said counterweight to check the upward travel of said carriage at a waiting level below the path of travel of said cars, a control device tripped by a car having a load destined for such station, the tripping of said device causing the operating means to raise the carriage and remove the load from the car, a control device tripped by said counterweight to stop the travel of the carriage after it has removed the load, another control tripped by said car as it leaves the station for causing said operating means to lower the carriage with the load therein to the bottom of the well, a platform to which such load is delivered, control devices on said platform tripped by the load to stop the travel of the carriage, means for moving the load over the platform, and a control device tripped by said load for causing said means to raise the carriage to the waiting level.

10. In a conveyer system comprising a conveyer including a plurality of load-transporting cars, a control unit on each car comprising a housing, a rod mounted therein and a plurality of dogs supported upon said rod and rotatable relative thereto, each dog having two fingers at such an angle to each other that only one finger projects outwardly from the housing at the same time and on different parallel planes, and dog-tripping means at each loading station adapted to be extended into the path of travel of a selected dog on a car approaching such station, said means tripping the projecting finger of that dog and thereby causing the other finger to project so that the car leaves the station with the last-named finger of the dog projecting from the housing.

11. In a conveyer system comprising a conveyer including a plurality of load-transporting cars, a control unit on each car comprising a housing, a rod mounted therein and a plurality of dogs supported upon said rod and rotatable relative thereto, each dog having two fingers at such an angle to each other that only one finger projects outwardly from the housing at the same time and on different parallel planes, and dog-tripping means at each loading station adapted to be extended into the path of travel of a selected dog on a car approaching such station, said means tripping the projecting finger of that dog and thereby causing the other finger to project so that the car leaves the station with the last-named finger of the dog projecting from the housing, such dog-tripping means including a housing, a tab movable in a horizontal plane into and out of said housing, a solenoid mounted in said housing and having a downwardly movable plunger, and a rocker plate movable in a vertical plane and connected at one end to said plunger and at the other end to said tab whereby the travel of the plunger responsive to the energizing or deenergizing of the solenoid is transmitted through the plate to the tab.

12. In a conveyer system comprising a conveyer including a plurality of load-transporting cars, a control unit on each car comprising a housing, a rod mounted therein and a plurality of dogs supported upon said rod and rotatable relative thereto, each dog having two fingers at such an angle to each other that only one finger projects outwardly from the housing at the same time and on different parallel planes, and dog-tripping means at each loading station adapted to be extended into the path of travel of a selected dog on a car approaching such station, said means tripping the projecting finger of that dog and thereby causing the other finger to project so that the car leaves the station with the last-named finger of the dog projecting from the housing, such dog-tripping means including a vertical post, a tab movable along said post, means for raising said tab along said post into the path of travel of the selected dog, and means for holding said tab in that position.

13. In a conveyer system comprising a conveyer including a plurality of load-transporting cars, a control unit on each car comprising a housing, a rod mounted therein and a plurality of dogs supported upon said rod and rotatable relative thereto, each dog having two fingers at such an angle to each other that only one finger projects outwardly from the housing at the same time and on different parallel planes, and dog-tripping means at each loading station adapted to be extended into the path of travel of a selected dog on a car approaching such station, said means tripping the projecting finger of that dog and thereby causing the other finger to project so that the car leaves the station with the last-named finger of the dog projecting from the housing, such dog-tripping means including a vertical post, a tab movable along said post, means for raising said tab along said post into the path of travel of the selected dog, and means for holding said tab in that position, said last-named means being rendered inoperative by the last-named finger of the dog whereby the tab is free to descend along said post out of the dog-engaging position.

14. In a conveyer system comprising a conveyer including a plurality of load-transporting cars, a control unit on each car comprising a housing, a rod mounted therein and a plurality of dogs supported upon said rod and rotatable relative thereto, each dog having two fingers at such an angle to each other that only one finger projects outwardly from the housing at the same time and on different parallel planes, and dog-tripping means at each loading station adapted to be extended into the path of travel of a selected dog on a car approaching such station, said means tripping the projecting finger of that dog and thereby causing the other finger to project so that the car leaves the station with the last-named finger of the dog projecting from the housing, such dog-tripping means including a rotatably mounted vertical post, a tab movable along said post but held from rotation therearound, means for raising said tab along said post into the path of travel of the selected dog, means for holding said tab in that position, and means actuated by a load on the approaching car for rotating said post, thus rendering the holding means inoperative and permitting the tab to descend along the post out of the dog-engaging position.

WILLIAM J. TAYLOR.
JOHN E. REGAN.
ALBERT N. KLYVER.
PAUL R. KUHN.